(12) United States Patent
Wang et al.

(10) Patent No.: US 11,265,414 B2
(45) Date of Patent: Mar. 1, 2022

(54) METHOD AND DEVICE FOR WAKING UP VOICE RECOGNITION FUNCTION IN MOBILE TERMINAL, AND COMPUTER READABLE STORAGE MEDIUM

(71) Applicant: BEIJING BAIDU NETCOM SCIENCE AND TECHNOLOGY CO., LTD., Beijing (CN)

(72) Inventors: Kang Wang, Beijing (CN); Minqiang Chang, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 164 days.

(21) Appl. No.: 16/732,488

(22) Filed: Jan. 2, 2020

(65) Prior Publication Data
US 2020/0220967 A1  Jul. 9, 2020

(30) Foreign Application Priority Data
Jan. 3, 2019 (CN) .......................... 201910005247.5

(51) Int. Cl.
*H04M 1/72454* (2021.01)
*G10L 15/22* (2006.01)
*G10L 15/26* (2006.01)

(52) U.S. Cl.
CPC ......... *H04M 1/72454* (2021.01); *G10L 15/22* (2013.01); *G10L 15/26* (2013.01); *H04M 2250/74* (2013.01)

(58) Field of Classification Search
None
See application file for complete search history.

(56) References Cited

U.S. PATENT DOCUMENTS 8,862,474 B2 * 10/2014 Burke .................... G10L 15/26
   704/270
10,928,918 B2 * 2/2021 Lemay .................. G06F 1/1694
(Continued)

FOREIGN PATENT DOCUMENTS

CN   103701981 A   4/2014
CN   104298904 A   1/2015
(Continued)

OTHER PUBLICATIONS

Office Action for Chinese Application No. 201910005247.5, dated May 8, 2020, 22 pages.
(Continued)

*Primary Examiner* — Stella L. Woo
(74) *Attorney, Agent, or Firm* — Fay Sharpe LLP (57) ABSTRACT

The present disclosure provides a method and device for waking up a voice recognition function in a mobile terminal. The method includes: receiving a trigger instruction of an input interface, and activating the input interface; acquiring a rotation angle of the mobile terminal in a first rotation direction with an x-axis as a rotation axis, in which the x-axis is a widthwise direction of a screen of the mobile terminal; and activating the voice recognition function when the rotation angle of the mobile terminal in the first rotation direction with the x-axis as the rotation axis is greater than or equal to a first trigger threshold.

20 Claims, 3 Drawing Sheets

--- receiving a trigger instruction of an input interface, and activating the input interface — 101 acquiring a rotation angle of the mobile terminal in a first rotation direction with an x-axis as a rotation axis, in which the x-axis is a widthwise direction of a screen of the mobile terminal — 102 activating the voice recognition function when the rotation angle of the mobile terminal in the first rotation direction with the x-axis as the rotation axis is greater than or equal to a first trigger threshold — 103

(56) References Cited

U.S. PATENT DOCUMENTS

| | | | | |
|---|---|---|---|---|
| 2009/0164219 | A1* | 6/2009 | Yeung | G06F 3/0346 704/258 |
| 2014/0379341 | A1* | 12/2014 | Seo | G06F 1/163 704/246 |
| 2015/0100322 | A1* | 4/2015 | Lee | H04N 21/42209 704/275 |
| 2016/0034253 | A1* | 2/2016 | Bang | G06F 9/5055 715/728 |
| 2017/0025121 | A1 | 1/2017 | Tang | |
| 2017/0262065 | A1* | 9/2017 | Elkins | G06F 1/1694 |
| 2017/0315777 | A1 | 11/2017 | Li et al. | |
| 2019/0379822 | A1* | 12/2019 | Leong | G11B 27/031 |

FOREIGN PATENT DOCUMENTS

| | | |
|---|---|---|
| CN | 105092891 A | 11/2015 |
| CN | 106251605 A | 12/2016 |
| JP | 2010217754 A | 9/2010 |
| JP | 2014533446 A | 12/2014 |
| JP | 2015139171 A | 7/2015 |
| JP | 2018085091 A | 5/2018 |
| KR | 20140051968 A | 5/2014 |
| KR | 20160095418 A | 8/2016 |
| WO | 2008069241 A1 | 6/2008 |

OTHER PUBLICATIONS

Extended European Search Report for Application No. 20150039.4, dated May 15, 2020, 7 pages.

Office Action for Korean Application No. 10-2019-0173635, dated May 6, 2021, 5 pages.

Office Action for Japanese Application No. 2019-234463, dated Jan. 19, 2021, 6 pages.

* cited by examiner

METHOD AND DEVICE FOR WAKING UP VOICE RECOGNITION FUNCTION IN MOBILE TERMINAL, AND COMPUTER READABLE STORAGE MEDIUM

CROSS-REFERENCE TO RELATED APPLICATION

The present application is based upon and claims priority to Chinese Patent Application No. 201910005247.5, filed on Jan. 3, 2019, the entirety contents of which are incorporated herein by reference.

TECHNICAL FIELD

The present disclosure relates to the field of mobile terminal technology, and more particularly, to a method and device for waking up a voice recognition function in a mobile terminal, and a computer readable storage medium.

BACKGROUND

The existing mobile terminals are fully functional as the development of mobile terminal technology, for example, in a case where it is inconvenient for a user to type, voice can be input with a voice input function instead of inputting text.

Currently, the voice input function of an existing smart phone on the market requires the user to manually click the voice function key to trigger the voice input, and in the case of holding the mobile phone with one hand, the voice function key may not be clicked. It can be seen that the existing method of triggering the voice input function not only leads to cumbersome user operations, but also has low voice input efficiency.

SUMMARY

Embodiments of the present disclosure provide a method and device for waking up a voice recognition function in a mobile terminal and a computer readable storage medium.

Embodiments of the present disclosure provide a method for waking up a voice recognition function in a mobile terminal, the method includes: receiving a trigger instruction of an input interface, and activating the input interface; acquiring a rotation angle of the mobile terminal in a first rotation direction with an x-axis as a rotation axis, in which the x-axis is a widthwise direction of a screen of the mobile terminal; and activating the voice recognition function when the rotation angle of the mobile terminal in the first rotation direction with the x-axis as the rotation axis is greater than or equal to a first trigger threshold.

Embodiments of the present disclosure provide a device for waking up a voice recognition function in a mobile terminal, the device includes: a receiving module, configured to receive a trigger instruction of an input interface, and activating the input interface; a first acquiring module, configured to acquire a rotation angle of the mobile terminal in a first rotation direction with an x-axis as a rotation axis, in which the x-axis is a widthwise direction of a screen of the mobile terminal; and an activating module, configured to activate the voice recognition function when the rotation angle of the mobile terminal in the first rotation direction with the x-axis as the rotation axis is greater than or equal to a first trigger threshold.

Embodiments of the present disclosure provide a computer readable storage medium having a computer program stored thereon, wherein when the program is executed by a processor, a method for waking up a voice recognition function in a mobile terminal is implemented. The method may include: receiving a trigger instruction of an input interface, and activating the input interface; acquiring a rotation angle of the mobile terminal in a first rotation direction with an x-axis as a rotation axis, in which the x-axis is a widthwise direction of a screen of the mobile terminal; and activating the voice recognition function when the rotation angle of the mobile terminal in the first rotation direction with the x-axis as the rotation axis is greater than or equal to a first trigger threshold.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

The method and device for waking up a voice recognition function in a mobile terminal are described below with reference to the drawings.

Embodiments of the present disclosure provide a method for waking up a voice recognition function in a mobile terminal, for solving the problem that the existing method of triggering the voice input function not only leads to cumbersome user operations, but also has low voice input efficiency.

With the method for waking up the voice recognition function in the mobile terminal according to embodiments of the present disclosure, after activating the input interface, a rotation angle of the mobile terminal in a first rotation direction with the x-axis as the rotation axis is acquired, and the voice recognition function is activated when the rotation angle of the mobile terminal in the first rotation direction with the x-axis as the rotation axis is greater than or equal to a first trigger threshold. Therefore, the voice recognition function can be automatically activated according to the rotation angle of the mobile terminal in the first rotation direction with the x-axis as the rotation axis, so that the user can input the voice without manually clicking the voice function key, which eases user operations and frees the user's hands, and improves the efficiency of voice inputting.

Figure 1:
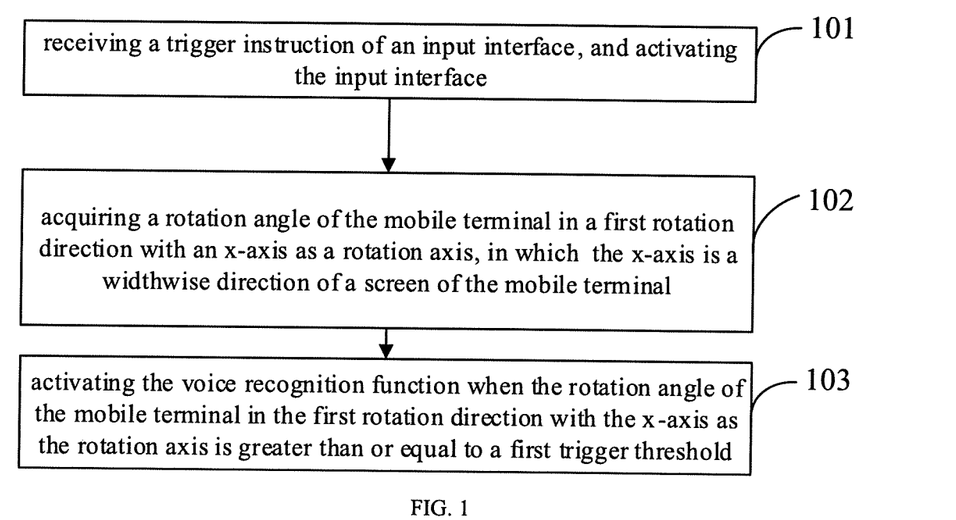
FIG. 1 is a flowchart of a method for waking up a voice recognition function in a mobile terminal according to an embodiment of the present disclosure.

FIG. 1 is a flowchart of a method for waking up a voice recognition function in a mobile terminal according to an embodiment of the present disclosure.

The method for waking up the voice recognition function in the mobile terminal of the embodiment of the present disclosure may be performed by a device for waking up the voice recognition function in the mobile terminal provided by the present disclosure. The device may be configured in a mobile terminal such as a smart phone or a tablet computer having a voice input function. Therefore, the voice recognition function can be automatically activated according to the rotation angle of the mobile terminal in the first rotation direction with the x-axis as the rotation axis, so that the user can input the voice directly.

As illustrated in FIG. 1, the method for waking up the voice recognition function in the mobile terminal includes the following steps.

At step 101, a trigger instruction of an input interface is received, and the input interface is activated.

When the user clicks an input box in the mobile terminal, the mobile terminal receives the trigger instruction of the input interface, and activates the input interface according to the trigger instruction.

For example, when the user clicks the input box in the chat interface of an instant messaging application, the mobile terminal pops up an input method interface.

At step 102, a rotation angle of the mobile terminal in a first rotation direction with an x-axis as a rotation axis is acquired, in which the x-axis is a widthwise direction of a screen of the mobile terminal.

In practical applications, the microphone of the mobile terminal is usually at the bottom of the mobile terminal. When the user inputs voice, the bottom of the mobile phone is tilted up to be close to the mouth, that is, when the user inputs voice, the mobile terminal is rotated at a certain angle in the widthwise direction of the mobile terminal.

Figure 2:
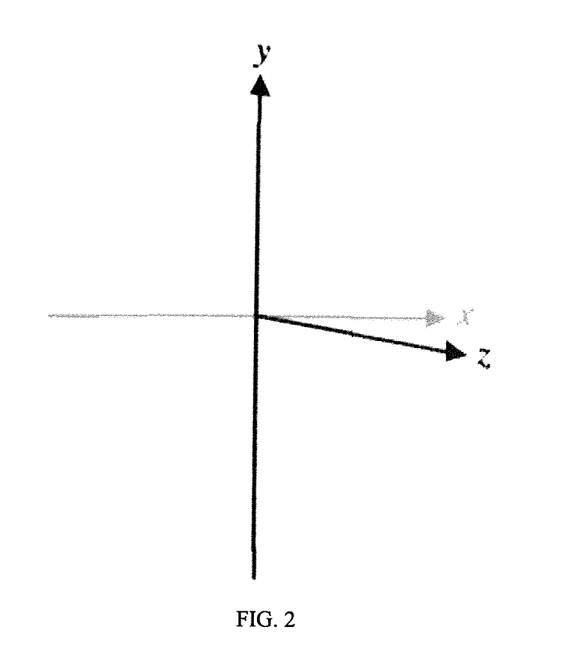
FIG. 2 is a schematic diagram of a space rectangular coordinate system according to an embodiment of the present disclosure.

In this embodiment, when the input interface is activated, the mobile terminal is considered to be in a normal state, and a spatial rectangular coordinate system is established at the current position state of the mobile terminal when the input interface is activated. Specifically, when the input interface is activated, the widthwise direction of the screen of the mobile terminal is the x-axis, the longitudinal direction of the screen of the mobile terminal is the y-axis, and the direction perpendicular to the plane of the screen of the mobile terminal is the z-axis, such that the spatial rectangular coordinate system is established. FIG. 2 is a schematic diagram of a space rectangular coordinate system according to an embodiment of the present disclosure.

In the embodiments of the present disclosure, after the input interface is activated by the mobile terminal, the rotation angle of the mobile terminal in the first rotation direction on the x-axis is obtained. In a specific implementation, after the mobile terminal starts the input interface, the rotation angle of the mobile terminal in the first rotation direction with the x-axis as the rotation axis can be obtained in real time by using the gyroscope in the mobile terminal.

It can be understood that the rotation angle of the mobile terminal in the first rotation direction with the x-axis as the rotation axis is the rotation angle of the mobile terminal along the first rotation direction on the x-axis at this time.

In this embodiment, the first rotation direction may be an extension direction of the screen of the mobile terminal. That is, after the mobile terminal activates the input interface, the rotation angle of the mobile terminal in any extension direction of the screen with the x-axis as the rotation axis is acquired.

At step 103, the voice recognition function is activated, when the rotation angle of the mobile terminal in the first rotation direction with the x-axis as the rotation axis is greater than or equal to a first trigger threshold.

The first trigger threshold is a threshold for the mobile terminal to automatically activate the voice recognition function, which may be set according to actual needs.

When the rotation angle of the mobile terminal in the first rotation direction with the x-axis as the rotation axis is greater than or equal to the first trigger threshold, it indicates that the user tilts the mobile terminal by a certain angle, i.e., the user intends to input voice, such that the voice recognition function is automatically activated.

For example, assuming that the first trigger threshold is 45°, when the mobile terminal activates the input interface, and the mobile terminal is rotated at the current position in the direction of the screen with the x-axis as the rotation axis, if the rotation angle of the mobile terminal titled in the direction of the screen with the x-axis as the rotation axis is greater than 45°, the voice recognition function is activated.

When the input interface is activated, the mobile terminal is in a normal position. In the embodiments of the present disclosure, by acquiring the rotation angle of the mobile terminal rotated in the first rotation direction with the x-axis as the rotation axis, the voice recognition function is activated, and by determining whether the rotation angle is greater than or equal to the first trigger threshold, it may be determined automatically whether to activate the voice recognition function. Therefore, the voice recognition function may be activated automatically according to the rotation angle of the mobile terminal rotated in the first rotation direction with the x-axis as the rotation axis after the mobile terminal activates the input interface.

Further, when the user uses the voice recognition function of the mobile terminal, the mouth of the user is usually close to the microphone of the mobile terminal. In order to further improve the accuracy of activating the voice recognition function, after the mobile terminal activates the input interface, a distance sensor in the mobile terminal monitors the distance between the user and the mobile terminal in real time. When the rotation angle of the mobile terminal in the first rotation direction with the x-axis as the rotation axis is greater than or equal to the first trigger threshold, and when the distance between the mobile terminal and the user is smaller than the preset distance threshold, the voice recognition function is activated.

Figure 3:
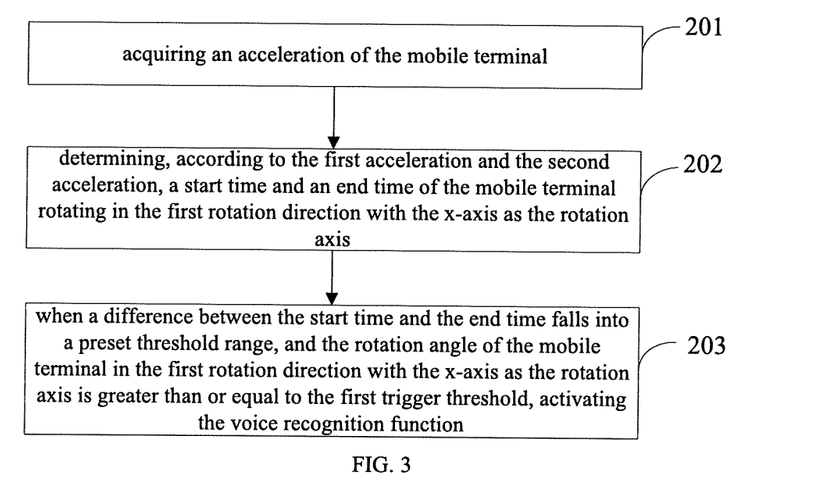
FIG. 3 is a flowchart of method for waking up a voice recognition function in a mobile terminal according to another embodiment of the present disclosure.

On the basis of the embodiment shown in FIG. 1, in order to further improve the accuracy of activating the voice recognition function, in an embodiment of the present disclosure, according to the acceleration in a direction along the y-axis and the z-axis of the mobile terminal, the mobile terminal is rotated in the first rotation direction with the x-axis as the rotation axis by a rotation angle meets the requirement at the same time, the voice recognition function is activated. As illustrated in FIG. 3, FIG. 3 is a flowchart of another method for waking up a voice recognition function in a mobile terminal according to an embodiment of the present disclosure.

As illustrated in FIG. 3, the method for waking up the voice recognition function in the mobile terminal further includes the following steps.

At step 201, an acceleration of the mobile terminal is acquired.

The acceleration of the mobile terminal includes an acceleration of the mobile terminal in a direction along the y-axis and a second acceleration in a second direction along the y-axis. When the mobile terminal activates the input interface, the y-axis is the longitudinal direction of the screen of the mobile terminal and the z-axis is a direction perpendicular to the screen of the mobile terminal. The positive direction of the y-axis may be from the bottom to the top of the mobile terminal, and the positive direction of the z-axis is the direction of the mobile terminal from distant to close to the user, as illustrated in FIG. 2.

In this embodiment, while monitoring the rotation angle of the mobile terminal in the first rotation direction with the x-axis as the rotation axis by using the gyroscope in the mobile terminal, the acceleration sensor in the mobile terminal can be used to monitor the acceleration of the mobile terminal in a direction along the y-axis and the z-axis. For convenience of distinction, in the embodiment of the present disclosure, the acceleration of the mobile terminal in a direction along the y-axis is referred to as a first acceleration, and the acceleration in a direction along the z-axis is referred to as a second acceleration.

After the mobile terminal activates the input interface, the first acceleration and the second acceleration when the mobile terminal rotates are obtained.

At step 202, according to the first acceleration and the second acceleration, a start time and an end time of the mobile terminal rotating in the first rotation direction with the x-axis as the rotation axis are determined.

In practical applications, when the user inputs voice in the mobile terminal, the bottom end of the mobile terminal is usually tilted up by a certain angle and moved toward the user, and the top end of the mobile terminal moves downward. It can be seen that when the mobile terminal starts to rotate, the acceleration of the mobile terminal in a direction along the y-axis is smaller than zero, and the acceleration in a direction along the z-axis direction is greater than zero. On the contrary, when the rotation ends, the acceleration of the mobile terminal in a direction along the y-axis is greater than zero, and the acceleration in a direction along the z-axis is less than zero. Thereby, the start time and the end time of the mobile terminal rotating in the first rotation direction with the x-axis as the rotation axis can be determined according to the magnitude of the acceleration of the mobile terminal in a direction along the y-axis and the z-axis.

In this embodiment, when the first acceleration of the mobile terminal in a direction along the y-axis is smaller than zero, and the second acceleration in a direction along the z-axis is greater than zero, and the sum of the first acceleration and the second acceleration is greater than the first preset threshold, it is considered that the mobile terminal starts to rotate, and the current time is determined as the start time of the rotation of the mobile terminal.

It should be noted that, during a period of time after the mobile terminal starts to rotate, the first acceleration and the second acceleration may satisfy the foregoing conditions. In this embodiment, after the input interface is activated, the time when the first acceleration and the second acceleration satisfying the above requirements are first monitored is taken as the start time of the rotation.

During the rotation of the mobile terminal, the acceleration of the mobile terminal in the direction along the y-axis and in the direction along the z-axis is continuously obtained and monitored, when it is detected that the first acceleration is greater than zero, the second acceleration is smaller than zero, and the sum of the first acceleration and the second acceleration is greater than the second preset threshold for the first time, it is indicated that the rotation of the mobile terminal ends, and then the current time is determined as the end time of the rotation of the mobile terminal.

It should be noted that the first preset threshold and the second preset threshold may be determined by determining the acceleration of the mobile terminal when starting the rotation of the mobile terminal before the user performs the voice input, and the acceleration of the mobile terminal at the time of inputting the voice when ending the rotation of the mobile terminal.

At step 203, when a difference between the start time and the end time falls into a preset threshold range, and the rotation angle of the mobile terminal in the first rotation direction with the x-axis as the rotation axis is greater than or equal to the first trigger threshold, the voice recognition function is activated.

In practical applications, when the user inputs the voice, the time taken to rotate the mobile terminal usually falls into a certain range, otherwise, it indicates that the time taken to rotate the mobile terminal is too long or too short, and the rotation of the mobile terminal can be considered not related to voice input.

Based on this, in this embodiment, the difference between the start time and the end time of the rotation of the mobile terminal is calculated, and if the difference between the start time and the end time of the rotation of the mobile terminal falls in the preset threshold range, for example, if the difference is greater than the third preset threshold and is smaller than the fourth preset threshold, and the rotation angle of the mobile terminal in the first rotation direction with the x-axis as the rotation axis is greater than or equal to the first trigger threshold, that is, after the input interface is activated, if the rotation time of the mobile terminal falls into the preset threshold range, and the rotation angle of the mobile terminal in the first rotation direction with the x-axis as the rotation axis is greater than or equal to the first trigger threshold during the rotation, then the voice recognition function is activated.

The third preset threshold and the fourth preset threshold may be determined by measuring the time taken by the user to rotate the mobile terminal to perform voice input.

Further, on the basis of the embodiment shown in FIG. 3, after the input interface is activated, the distance between the mobile terminal and the user may be acquired and used as one of the conditions for determining whether to activate the voice recognition function. That is, when the rotation time of the mobile terminal in the first rotation direction with the x-axis as the rotation axis is within a preset threshold range, the distance between the mobile terminal and the user is smaller than a preset distance threshold, and the rotation angle of the mobile terminal in the first rotation direction with the x-axis as the rotation axis is greater than or equal to the first trigger threshold, the voice recognition function is activated, thereby further improving the accuracy of activating the voice recognition function.

Further, in order to avoid erroneous activations of the voice recognition function caused by jitters, it is also possible to determine whether the sum of the absolute values of the first acceleration and the second acceleration within a preset time period after the start of the rotation, that is, within a preset time period after the mobile terminal starts rotating, is greater than a fifth preset threshold. If the value is greater than the fifth preset threshold, and the difference between the start time and the end time of the mobile terminal rotating in the first rotation direction with the x-axis as the rotation axis is within a preset threshold range, the rotation angle of the mobile terminal rotating in the first rotation direction with the x-axis as the rotation axis is greater than or equal to the first trigger threshold, and the distance between the mobile terminal and the user is smaller than the preset distance threshold, the voice recognition function is activated. Therefore, the mobile terminal is prevented from being shaken back and forth to cause a false activation, and the accuracy of the voice recognition function is improved.

In the embodiments of the present disclosure, after the input interface is activated, the rotation angle of the mobile terminal in the first rotation direction with the x-axis as the rotation axis is acquired, and the acceleration in the y-axis and the acceleration in the z-axis when rotating are acquired, and according to the first acceleration and the second acceleration, the start time and the end time of the rotation of the mobile terminal can be determined, when the time used for the rotation falls into the preset threshold range, and the rotation angle of the mobile terminal in the first rotation direction with the x-axis as the rotation axis is greater than or equal to the first trigger threshold, the voice recognition function is activated, thereby greatly improving the accuracy of the voice recognition function.

Figure 4:
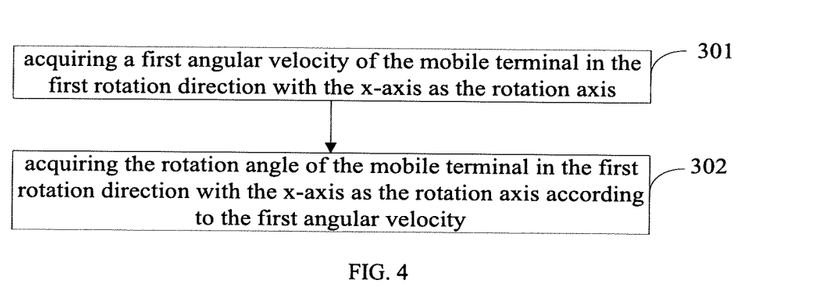
FIG. 4 is a flowchart of a method for waking up a voice recognition function in a mobile terminal according to yet another embodiment of the present disclosure.

In an embodiment of the present disclosure, when acquiring the rotation angle of the mobile terminal in the first rotation direction with the x-axis as the rotation axis, a first angular velocity may be first acquired, and then the rotation angle of the mobile terminal in the first rotation direction with the x-axis as the rotation axis is acquired according to the first angular velocity. FIG. 4 is a flowchart of a method for waking up a voice recognition function in a mobile terminal according to yet another embodiment of the present disclosure.

As illustrated in FIG. 4, acquiring the rotation angle of the mobile terminal in the first rotation direction with the x-axis as the rotation axis includes the following steps.

At step 301, a first angular velocity of the mobile terminal in the first rotation direction with the x-axis as the rotation axis is acquired.

In this embodiment, the first angular velocity of the mobile terminal in the first rotation direction with the x-axis as the rotation axis is monitored in real time by the gyroscope in the mobile terminal, and the rotation time of the mobile terminal in the first rotation direction with the x-axis as the rotation axis is recorded.

At step 302, the rotation angle of the mobile terminal in the first rotation direction with the x-axis as the rotation axis is acquired according to the first angular velocity.

As a possible implementation, the result of the multiplication of the first angular velocity and the rotation time of the mobile terminal in the first rotational direction with the x-axis as the rotation axis may be the rotation angle of the mobile terminal in the first rotational direction with the x-axis as the rotation axis.

In practical applications, when the user rotates the mobile terminal, the speed of rotating the mobile terminal may not be uniform, that is, the first angular velocity of the mobile terminal may not be uniform, in order to improve the calculation accuracy of the rotation angle of the mobile terminal in the first rotational direction with the x-axis as the rotation axis, an integration method can be adopted for calculation.

As another possible implementation manner, the first angular velocity of the mobile terminal in the first rotation direction with the x-axis as the rotation axis is monitored in real time by the gyroscope, and an integral of the first angular velocity is calculated in real time on the rotation time of the mobile terminal in the first rotation direction with the x-axis as the rotation axis. The integral result is the rotation angle of the mobile terminal in the first rotation direction with the x-axis as the rotation axis.

After calculating the rotation angle of the mobile terminal in the first rotation direction with the x-axis as the rotation axis, it is determined whether the rotation angle is greater than or equal to the first preset threshold. The voice recognition function is activated when the rotation angle of the mobile terminal in the first rotation direction with the x-axis as the rotation axis is greater than or equal to the first trigger threshold.

In the embodiments of the present disclosure, after the input interface is activated, the rotation angle of the mobile terminal is acquired, and the angular velocity of the mobile terminal in the first rotation direction with the x-axis as the rotation axis is obtained according to the angular velocity. When the rotation angle of the mobile terminal in the first rotation direction with the x-axis as the rotation axis is greater than or equal to the first trigger threshold, the voice recognition function is automatically activated, thereby easing user operations and improving voice inputting efficiency.

Figure 5:
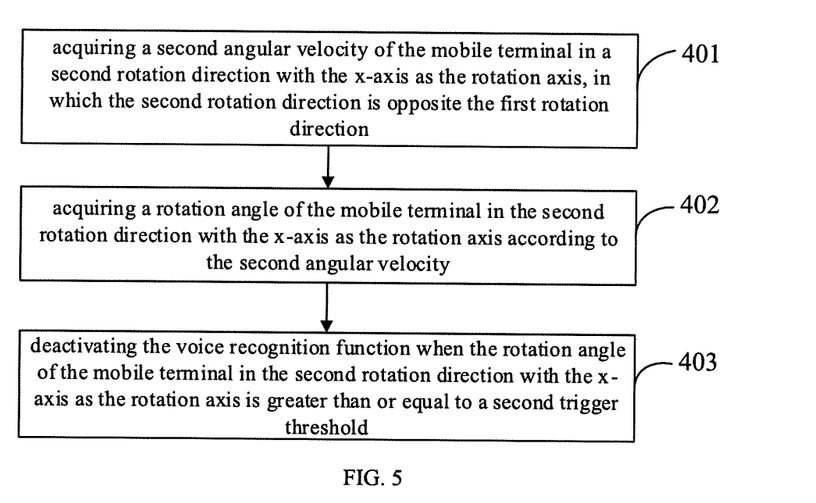
FIG. 5 is a flowchart of a method for waking up a voice recognition function in a mobile terminal according to still another embodiment of the present disclosure.

In practical applications, when the voice input ends, the mobile terminal is removed and is in a normal use posture. Therefore, in an embodiment of the present disclosure, after the voice recognition function is activated, when the user rotates the terminal in a direction opposite the first rotation direction, it is determined whether to turn off the voice recognition function according to the rotation angle of the mobile terminal in the first rotation direction with the x-axis as the rotation axis. FIG. 5 is a flowchart of a method for waking up a voice recognition function in a mobile terminal according to still another embodiment of the present disclosure.

As illustrated in FIG. 5, after the voice recognition function is activated, the method for waking up the voice recognition function in the mobile terminal further includes the following steps.

At step 401, a second angular velocity of the mobile terminal in a second rotation direction with the x-axis as the rotation axis is acquired, the second rotation direction is opposite the first rotation direction.

After the voice recognition function is activated, the second angular velocity of the mobile terminal in the second rotation direction with the x-axis as the rotation axis is continuously monitored in real time by the gyroscope. The second rotation direction is opposite the first rotation direction. For example, the first rotation direction is that the bottom end of the mobile terminal rotating towards the positive direction of the z-axis (named as the screen direction of the mobile terminal), and the second rotation direction is opposite the screen direction of the mobile terminal.

At step 402, a rotation angle of the mobile terminal in the second rotation direction with the x-axis as the rotation axis is acquired according to the second angular velocity.

In this embodiment, by using the above method for calculating the rotation angle of the mobile terminal in the first rotation direction with the x-axis as the rotation axis, the rotation angle of the mobile terminal in the second rotation direction with the x-axis as the rotation axis can be calculated according to the second angular velocity.

Since the user rotates the mobile terminal in the second rotation direction with the x-axis as the rotation axis (i.e., revolving the mobile terminal on the x-axis), the spatial rectangular coordinate system is established at the current position of the mobile terminal. Specifically, the widthwise direction of the screen of the mobile terminal can be the x-axis, the longitudinal direction of the screen of the mobile terminal is the y-axis, and the direction perpendicular to the plane of the screen of the mobile terminal is the z-axis. Then, when the user rotates the mobile terminal in the second rotation direction with the x-axis as the rotation axis, the rotation angle of the mobile terminal in the second rotation direction with the x-axis as the rotation axis is acquired.

At step 403, the voice recognition function is deactivated when the rotation angle of the mobile terminal in the second rotation direction with the x-axis as the rotation axis is greater than or equal to a second trigger threshold.

The second trigger threshold is smaller than the first trigger threshold.

When the rotation angle of the mobile terminal in the second rotation direction with the x-axis as the rotation axis is greater than or equal to the second trigger threshold, it can be predicted that the use of the voice recognition function is completed, and then the mobile terminal can automatically turn off the voice recognition function. That is, when the rotation angle of the mobile terminal in the second rotation direction with the x-axis as the rotation axis reaches the second trigger threshold, the voice recognition function is turned off.

For example, assume that the first trigger threshold is 45° and the second trigger threshold is 15°, when the mobile terminal activates the input interface, if it is detected that the rotation angle of the mobile terminal in the screen direction with the x-axis as the rotation axis is 47° at the end of the rotation, it can be determined that the rotation angle of the mobile terminal in the first rotation direction with the x-axis as the rotation axis is 47°, which is greater than 45°, then the voice recognition function is activated.

After the voice recognition function is activated, when it is detected that the mobile terminal is rotated in a direction opposite to the direction of the screen of the mobile terminal with the x-axis as the rotation axis, it indicates that the use of the voice recognition function is completed, if the rotation angle of the mobile terminal in the first rotation direction with the x-axis as the rotation axis is 16°, which is greater than 15°, the voice recognition function is turned off.

With the method for waking up the voice recognition function in the mobile terminal according to embodiments of the present disclosure, after activating the input interface, a rotation angle of the mobile terminal in a first rotation direction with the x-axis as the rotation axis is acquired, and the voice recognition function is activated when the rotation angle of the mobile terminal in the first rotation direction with the x-axis as the rotation axis is greater than or equal to a first trigger threshold. Therefore, the voice recognition function can be automatically activated according to the rotation angle of the mobile terminal in the first rotation direction with the x-axis as the rotation axis, so that the user can input the voice without manually clicking the voice function key, which eases user operations and frees the user's hands, and improves the efficiency of voice inputting.

Further, in the embodiments of the present disclosure, when the voice recognition function is turned off, a certain fault-tolerant process is performed, that is, the second trigger threshold is smaller than the first trigger threshold, thereby preventing the user from causing the voice recognition function to turn off due to a slight change of the angle during the voice input process. In the embodiments of the present disclosure, the second trigger threshold is set to be smaller than the first trigger threshold, which allows a certain fault tolerance space after the voice recognition function is activated, thereby preventing the voice recognition function from being turned off too early.

Since the habits of different users using the mobile terminal are different, the rotation angle of the mobile terminal in the first rotation direction with the x-axis as the rotation axis is different when the user uses the mobile terminal normally during voice input. Further, in order to improve the accuracy of the voice recognition function, in an embodiment of the present disclosure, the user may also collect the rotation angle of the mobile terminal in the first rotation direction with the x-axis as the rotation axis every time the user of the mobile terminal activates the voice recognition function, thereby obtaining the first rotation angle sample set of the mobile terminal with the x-axis as the rotation axis when the user of the mobile terminal activates the voice recognition function.

The first rotation angle sample set includes a rotation angle of the mobile terminal in the first rotation direction with the x-axis as the rotation axis when the voice recognition function is activated by the user of the mobile terminal.

The first trigger threshold may be corrected according to the first set of rotation angle samples, so that the corrected first trigger threshold is closer to the rotation angle of the mobile terminal in the first rotation direction with the x-axis as the rotation axis, when the user activates the voice recognition function.

For example, an average value of the rotation angle of the mobile terminal in the first rotation direction in the first rotation angle sample is calculated, and then a difference between the first trigger threshold and the average value is calculated, and the first trigger threshold is modified according to the difference value to make the first trigger threshold equal to the average value.

In the embodiments of the present disclosure, when the voice recognition function is activated by the user, the first trigger threshold is corrected according to the rotation angle of the mobile terminal in the first rotation direction with the x-axis as the rotation axis, so that the first trigger threshold is closer to the user's habit, and the accuracy of the first trigger threshold.

Similarly, in an embodiment of the present disclosure, in an embodiment of the present disclosure, the rotation angle of the mobile terminal in the second rotation direction with the x-axis as the rotation axis is changed each time the user of the mobile terminal turns off the voice recognition function, thus a second rotation angle sample set of the mobile terminal with the x-axis as the rotation axis when the user of the mobile terminal turns off the voice recognition function may be acquired.

The second rotation angle sample set includes a rotation angle of the mobile terminal in the second rotation direction with the x-axis as the rotation axis may be acquired when the voice recognition function is turned off by the user of the mobile terminal.

Thereafter, the second trigger threshold is corrected according to the second set of rotation angle samples such that the corrected second trigger threshold is closer to the rotation angle of the mobile terminal in the second rotation direction with the x-axis as the rotation axis when the user turns off the voice recognition function.

For example, when the user uses the voice input function of the input method, each time the recording control is released, the rotation angle of the mobile terminal in the second rotation direction with the x-axis as the rotation axis is obtained, thus a second rotation angle sample set is obtained, and an average value of the rotation angle of the mobile terminal in the second rotation direction with the x-axis as the rotation axis in the second rotation angle sample set is calculated, and then a difference between the second trigger threshold and the average value is calculated, the second trigger threshold is modified according to the difference value to make the second trigger threshold equal to the average value.

In the embodiments of the present disclosure, when the voice recognition function is turned off by the user, the second trigger threshold is corrected according to the rotation angle of the mobile terminal in the second rotation direction with the x-axis as the rotation axis, so that the corrected second trigger threshold is closer to the user's habit, thereby preventing the voice recognition function to be turned off too early or too late, and improving the accuracy of the second trigger threshold.

Figure 6:
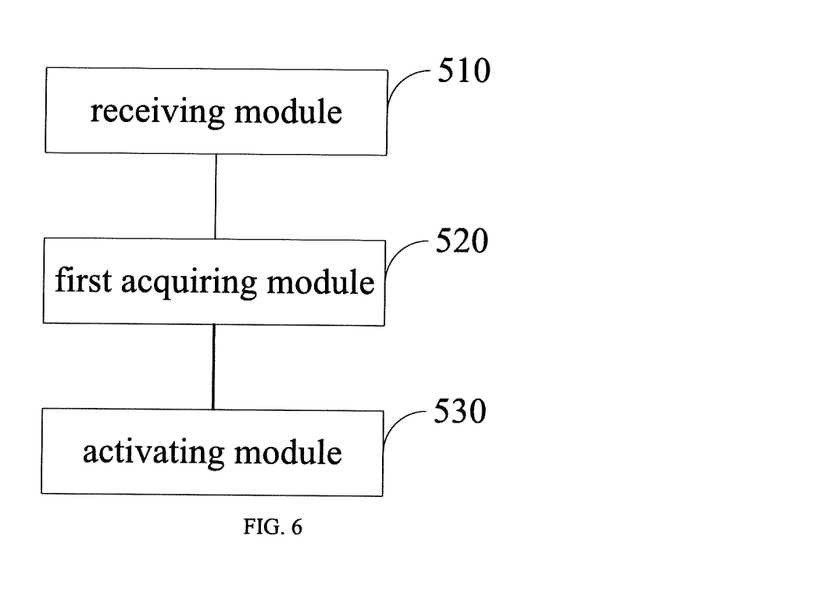
FIG. 6 is a schematic diagram of a device for waking up a voice recognition function in a mobile terminal according to an embodiment of the present disclosure.

In order to realize the above embodiments, embodiments of the present disclosure provide a device for waking up a voice recognition function in a mobile terminal. FIG. 6 is a schematic diagram of a device for waking up a voice recognition function in a mobile terminal according to an embodiment of the present disclosure.

As illustrated in FIG. 6, the device for waking up the voice recognition function in the mobile terminal includes: a receiving module 510, a first acquiring module 520, and an activating module 530.

The receiving module 510 is configured to receive a trigger instruction of an input interface, and activating the input interface.

The first acquiring module 520 is configured to acquire a rotation angle of the mobile terminal in a first rotation direction with an x-axis as a rotation axis, in which the x-axis is a widthwise direction of a screen of the mobile terminal.

The activating module 530 is configured to activate the voice recognition function when the rotation angle of the mobile terminal in the first rotation direction with the x-axis as the rotation axis is greater than or equal to a first trigger threshold.

In a possible implementation of this disclosure, the device further includes: a second acquiring module and a determining module.

The second acquiring module is configured to acquire an acceleration of the mobile terminal, in which the acceleration comprises a first acceleration of the mobile terminal in a direction along a y-axis and a second acceleration of the mobile terminal in a direction along a z-axis, and the y-axis is a longitudinal direction of the screen of the mobile terminal, and the z-axis is perpendicular to the screen of the mobile terminal.

The determining module is configured to determine, according to the first acceleration and the second acceleration, a start time and an end time of the mobile terminal rotating in the first rotation direction with the x-axis as the rotation axis.

The activating module 530 is configured to activate the voice recognition function, when a difference between the start time and the end time falls into a preset threshold range, and the rotation angle of the mobile terminal in the first rotation direction with the x-axis as the rotation axis is greater than or equal to the first trigger threshold.

In a possible implementation of this disclosure, the determining module is configured to: determine a time when the first acceleration is smaller than zero, the second acceleration is greater than zero, and a sum of the first acceleration and the second acceleration is greater than a first preset threshold as the start time; and determine a time when the first acceleration is greater than zero, the second acceleration is smaller than zero, and the sum of the first acceleration and the second acceleration is greater than a second preset threshold as the end time.

In a possible implementation of this disclosure, the first acquiring module 520 is configured to: acquire a first angular velocity of the mobile terminal in the first rotation direction with the x-axis as the rotation axis; and acquire the rotation angle of the mobile terminal in the first rotation direction with the x-axis as the rotation axis according to the first angular velocity.

In a possible implementation of this disclosure, the device further includes: a third acquiring module, a fourth acquiring module and a deactivating module.

The third acquiring module is configured to acquire a second angular velocity of the mobile terminal in a second rotation direction with the x-axis as the rotation axis, in which the second rotation direction is opposite the first rotation direction.

The fourth acquiring module is configured to acquire a rotation angle of the mobile terminal in the second rotation direction with the x-axis as the rotation axis according to the second angular velocity.

The deactivating module is configured to deactivate the voice recognition function when the rotation angle of the mobile terminal in the second rotation direction with the x-axis as the rotation axis is greater than or equal to a second trigger threshold, in which the second trigger threshold is smaller than the first trigger threshold.

In a possible implementation of this disclosure, the device further includes: a fifth acquiring module and a first modifying module.

The fifth acquiring module is configured to acquire a first sample set of rotation angles of the mobile terminal with the x-axis as the rotation axis which are obtained at a time of a user of the mobile terminal activating the voice recognition function.

The first modifying module is configured to modify the first trigger threshold according to the first sample set of rotation angles.

In a possible implementation of this disclosure, the device further includes: a sixth acquiring module and a second modifying module.

The sixth acquiring module is configured to acquire a second sample set of rotation angles of the mobile terminal with the x-axis as the rotation axis which are obtained at a time of a user of the mobile terminal deactivating the voice recognition function.

The second modifying module is configured to modify the second trigger threshold according to the second sample set of rotation angles.

In a possible implementation of this disclosure, the device further includes: a seventh acquiring module, configured to acquire a distance between the mobile terminal and a user.

The activating module 530 is configured to, when the distance between the mobile terminal and the user is smaller than a preset distance threshold, and the rotation angle of the mobile terminal in the first rotation direction with the x-axis as the rotation axis is greater than or equal to the first trigger threshold, activate the voice recognition function.

It should be noted that the foregoing description of the embodiment of the method for waking up the voice recognition function in the mobile terminal is also applicable to the device for waking up the voice recognition function in the mobile terminal in the embodiments, and therefore no further details are provided herein.

With the device for waking up the voice recognition function in the mobile terminal according to embodiments of the present disclosure, after activating the input interface, a rotation angle of the mobile terminal in a first rotation direction with the x-axis as the rotation axis is acquired, and the voice recognition function is activated when the rotation angle of the mobile terminal in the first rotation direction with the x-axis as the rotation axis is greater than or equal to a first trigger threshold. Therefore, the voice recognition function can be automatically activated according to the rotation angle of the mobile terminal in the first rotation direction with the x-axis as the rotation axis, so that the user can input the voice without manually clicking the voice function key, which eases user operations and frees the user's hands, and improves the efficiency of voice inputting.

Figure 7:
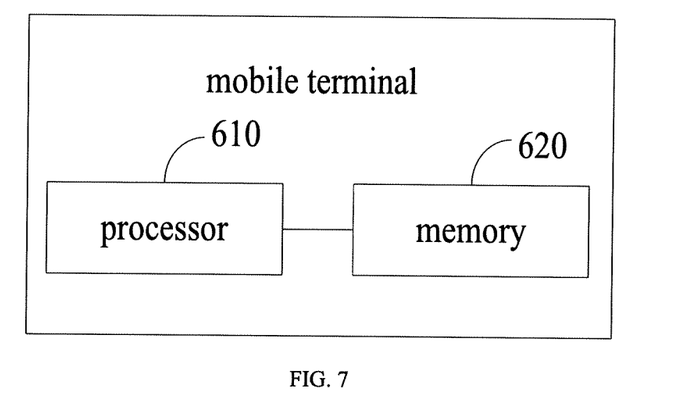
FIG. 7 is a schematic diagram of a mobile terminal according to an embodiment of the present disclosure.

In order to realize the above embodiments, the embodiments of the present disclosure also provide a mobile terminal. FIG. 7 is a schematic diagram of a mobile terminal according to an embodiment of the present disclosure. As illustrated in FIG. 7, the mobile terminal includes a processor 610 and a memory 620.

When the processor 610 runs a program corresponding to the executable program code by reading executable program code stored in the memory 620, the method for activating a voice recognition function in a mobile terminal according to the above embodiments is implemented.

In order to realize the above embodiments, the embodiments of the present disclosure also provide a computer readable storage medium having a computer program stored thereon, when the program is executed by a processor, the method for activating a voice recognition function in a mobile terminal according to the above embodiments is implemented.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for waking up a voice recognition function in a mobile terminal, comprising:
   receiving a trigger instruction of an input interface, and activating the input interface;
   acquiring a rotation angle of the mobile terminal in a first rotation direction with an x-axis as a rotation axis, wherein the x-axis is a widthwise direction of a screen of the mobile terminal; and automatically activating the voice recognition function and directly receiving a speech to be recognized of a user when the rotation angle of the mobile terminal in the first rotation direction with the x-axis as the rotation axis is greater than or equal to a first trigger threshold which indicates a bottom end of the mobile terminal is tilted up to be close to a mouth of the user and a top end of the mobile terminal moves downward.

2. The method according to claim 1, after activating the input interface, further comprises:
acquiring an acceleration of the mobile terminal, wherein the acceleration comprises a first acceleration of the mobile terminal in a direction along a y-axis and a second acceleration of the mobile terminal in a direction along a z-axis, and the y-axis is a longitudinal direction of the screen of the mobile terminal, and the z-axis is perpendicular to the screen of the mobile terminal;
determining, according to the first acceleration and the second acceleration, a start time and an end time of the mobile terminal rotating in the first rotation direction with the x-axis as the rotation axis; and
when a difference between the start time and the end time falls into a preset threshold range, and the rotation angle of the mobile terminal in the first rotation direction with the x-axis as the rotation axis is greater than or equal to the first trigger threshold, activating the voice recognition function.

3. The method according to claim 2, wherein determining, according to the first acceleration and the second acceleration, the start time and the end time of the mobile terminal rotating in the first rotation direction with the x-axis as the rotation axis, comprises:
determining a time when the first acceleration is smaller than zero, the second acceleration is greater than zero, and a sum of the first acceleration and the second acceleration is greater than a first preset threshold as the start time; and
determining a time when the first acceleration is greater than zero, the second acceleration is smaller than zero, and the sum of the first acceleration and the second acceleration is greater than a second preset threshold as the end time.

4. The method according to claim 1, wherein acquiring the rotation angle of the mobile terminal in the first rotation direction with the x-axis as the rotation axis, comprises:
acquiring a first angular velocity of the mobile terminal in the first rotation direction with the x-axis as the rotation axis; and
acquiring the rotation angle of the mobile terminal in the first rotation direction with the x-axis as the rotation axis according to the first angular velocity.

5. The method according to claim 4, further comprising:
acquiring a first sample set of rotation angles of the mobile terminal with the x-axis as the rotation axis which are obtained at a time of a user of the mobile terminal activating the voice recognition function; and
modifying the first trigger threshold according to the first sample set of rotation angles.

6. The method according to claim 4, further comprising:
acquiring a second sample set of rotation angles of the mobile terminal with the x-axis as the rotation axis which are obtained at a time of a user of the mobile terminal deactivating the voice recognition function; and
modifying the second trigger threshold according to the second sample set of rotation angles.

7. The method according to claim 1, after activating the voice recognition function, further comprising:
acquiring a second angular velocity of the mobile terminal in a second rotation direction with the x-axis as the rotation axis, wherein the second rotation direction is opposite the first rotation direction;
acquiring a rotation angle of the mobile terminal in the second rotation direction with the x-axis as the rotation axis according to the second angular velocity; and
deactivating the voice recognition function when the rotation angle of the mobile terminal in the second rotation direction with the x-axis as the rotation axis is greater than or equal to a second trigger threshold, wherein the second trigger threshold is smaller than the first trigger threshold.

8. The method according to claim 7, further comprising:
acquiring a first sample set of rotation angles of the mobile terminal with the x-axis as the rotation axis which are obtained at a time of a user of the mobile terminal activating the voice recognition function; and
modifying the first trigger threshold according to the first sample set of rotation angles.

9. The method according to claim 7, further comprising:
acquiring a second sample set of rotation angles of the mobile terminal with the x-axis as the rotation axis which are obtained at a time of a user of the mobile terminal deactivating the voice recognition function; and
modifying the second trigger threshold according to the second sample set of rotation angles.

10. The method according to claim 1, after activating the voice recognition function, further comprising:
acquiring a distance between the mobile terminal and a user; and
when the distance between the mobile terminal and the user is smaller than a preset distance threshold, and the rotation angle of the mobile terminal in the first rotation direction with the x-axis as the rotation axis is greater than or equal to the first trigger threshold, activating the voice recognition function.

11. A device for activating a voice recognition function in a mobile terminal, comprising:
one or more processors;
a memory storing instructions executable by the one or more processors;
wherein the one or more processors are configured to:
receive a trigger instruction of an input interface, and to activate the input interface;
acquire a rotation angle of the mobile terminal in a first rotation direction with an x-axis as a rotation axis, wherein the x-axis is a widthwise direction of a screen of the mobile terminal; and
automatically activate the voice recognition function directly receive a speech to be recognized of a user when the rotation angle of the mobile terminal in the first rotation direction with the x-axis as the rotation axis is greater than or equal to a first trigger threshold which indicates a bottom end of the mobile terminal is tilted up to be close to a mouth of the user and a top end of the mobile terminal moves downward.

12. The device according to claim 11, wherein the one or more processors are configured to:
acquire an acceleration of the mobile terminal, wherein the acceleration comprises a first acceleration of the mobile terminal in a direction along a y-axis and a second acceleration of the mobile terminal in a direction along a z-axis, and the y-axis is a longitudinal direction of the screen of the mobile terminal, and the z-axis is perpendicular to the screen of the mobile terminal;

determine, according to the first acceleration and the second acceleration, a start time and an end time of the mobile terminal rotating in the first rotation direction with the x-axis as the rotation axis; and when a difference between the start time and the end time falls into a preset threshold range, and the rotation angle of the mobile terminal in the first rotation direction with the x-axis as the rotation axis is greater than or equal to the first trigger threshold, activate the voice recognition function.

13. The device according to claim 12, wherein the one or more processors are configured to determine, according to the first acceleration and the second acceleration, the start time and the end time of the mobile terminal rotating in the first rotation direction with the x-axis as the rotation axis by performing acts of:

determining a time when the first acceleration is smaller than zero, the second acceleration is greater than zero, and a sum of the first acceleration and the second acceleration is greater than a first preset threshold as the start time; and determining a time when the first acceleration is greater than zero, the second acceleration is smaller than zero, and the sum of the first acceleration and the second acceleration is greater than a second preset threshold as the end time.

14. The device according to claim 13, wherein the one or more processors are configured to:

acquire a first sample set of rotation angles of the mobile terminal with the x-axis as the rotation axis which are obtained at a time of a user of the mobile terminal activating the voice recognition function; and modify the first trigger threshold according to the first sample set of rotation angles;

the one or more processors are further configured to:

acquire a second sample set of rotation angles of the mobile terminal with the x-axis as the rotation axis which are obtained at a time of a user of the mobile terminal deactivating the voice recognition function; and modify the second trigger threshold according to the second sample set of rotation angles.

15. The device according to claim 12, wherein the one or more processors are configured to:

acquire a first sample set of rotation angles of the mobile terminal with the x-axis as the rotation axis which are obtained at a time of a user of the mobile terminal activating the voice recognition function; and modify the first trigger threshold according to the first sample set of rotation angles.

16. The device according to claim 12, wherein the one or more processors are configured to:

acquire a second sample set of rotation angles of the mobile terminal with the x-axis as the rotation axis which are obtained at a time of a user of the mobile terminal deactivating the voice recognition function; and modify the second trigger threshold according to the second sample set of rotation angles.

17. The device according to claim 11, wherein the one or more processors are configured to acquire the rotation angle of the mobile terminal in the first rotation direction with the x-axis as the rotation axis by performing acts of:

acquiring a first angular velocity of the mobile terminal in the first rotation direction with the x-axis as the rotation axis; and acquiring the rotation angle of the mobile terminal in the first rotation direction with the x-axis as the rotation axis according to the first angular velocity.

18. The device according to claim 11, wherein the one or more processors are configured to:

acquire a second angular velocity of the mobile terminal in a second rotation direction with the x-axis as the rotation axis, wherein the second rotation direction is opposite the first rotation direction;

acquire a rotation angle of the mobile terminal in the second rotation direction with the x-axis as the rotation axis according to the second angular velocity; and deactivate the voice recognition function when the rotation angle of the mobile terminal in the second rotation direction with the x-axis as the rotation axis is greater than or equal to a second trigger threshold, wherein the second trigger threshold is smaller than the first trigger threshold.

19. The device according to claim 11, wherein the one or more processors are configured to acquire a distance between the mobile terminal and a user; and when the distance between the mobile terminal and the user is smaller than a preset distance threshold, and the rotation angle of the mobile terminal in the first rotation direction with the x-axis as the rotation axis is greater than or equal to the first trigger threshold, activate the voice recognition function.

20. A computer readable storage medium having a computer program stored thereon, wherein when the program is executed by a processor, a method for activating a voice recognition function in a mobile terminal is implemented, and the method comprises:

receiving a trigger instruction of an input interface, and activating the input interface;

acquiring a rotation angle of the mobile terminal in a first rotation direction with an x-axis as a rotation axis, wherein the x-axis is a widthwise direction of a screen of the mobile terminal; and automatically activating the voice recognition function directly receiving a speech to be recognized of a user when the rotation angle of the mobile terminal in the first rotation direction with the x-axis as the rotation axis is greater than or equal to a first trigger threshold which indicates a bottom end of the mobile terminal is tilted up to be close to a mouth of the user and a top end of the mobile terminal moves downward.

* * * * *